Oct. 8, 1963 M. K. HAYNES ETAL 3,106,702
MAGNETIC SHIFT REGISTER
Filed Dec. 31, 1957 3 Sheets-Sheet 1
FIG.1
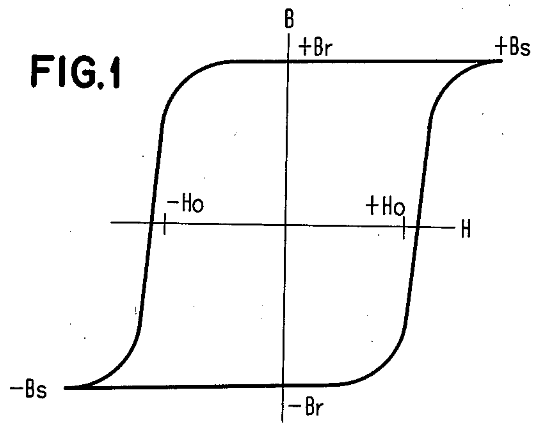
FIG.2
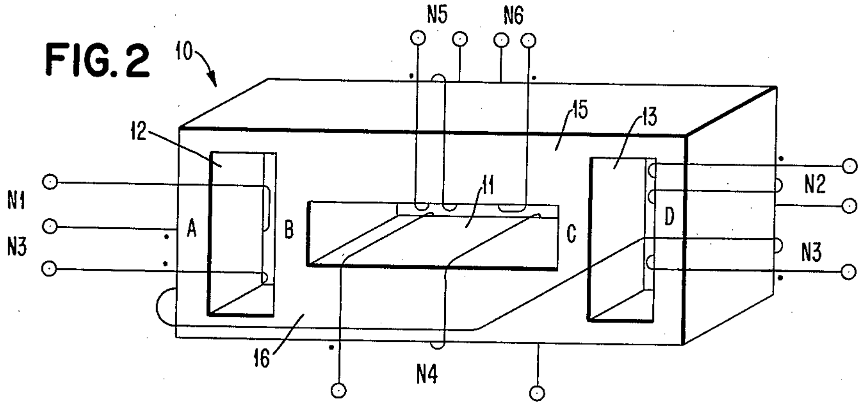
FIG.3
| LEG | | | |
|---|---|---|---|
| A | B | C | D |
| 1 | 1 | 0 | 0 |
| 0 | 1 | 1 | 0 |
| 0 | 1 | 0 | 1 |
| 1 | 0 | 1 | 0 |
| 1 | 0 | 0 | 1 |
| 0 | 0 | 1 | 1 |
*INVENTORS*
MUNRO K. HAYNES
NEWTON F. LOCKHART
*BY*
Harry T. Berriman
AGENT Oct. 8, 1963 M. K. HAYNES ETAL 3,106,702

MAGNETIC SHIFT REGISTER

Filed Dec. 31, 1957 3 Sheets-Sheet 2

United States Patent Office 3,106,702

Patented Oct. 8, 1963

3,106,702

MAGNETIC SHIFT REGISTER

Munro K. Haynes, Poughkeepsie, and Newton F. Lockhart, Wappingers Falls, N.Y., assignors to International Business Machines Corporation, New York, N.Y., a corporation of New York Filed Dec. 31, 1957, Ser. No. 706,522
11 Claims. (Cl. 340—174)

This invention relates to magnetic binary shift registers and more particularly to such a register wherein the principal circuit element for each stage of the register is a multipath magnetic core transfer device.

One difficulty in the use of magnetic cores as the main circuit element of each stage of a shift register is that on each transfer of binary bits of information, step by step, from the first or input core of the register through the intermediate stages of the register to the last or output stage of the register, spurious signals may be generated into adjacent cores forward and backward, by the transfer of the binary bit representation from any core to the succeeding core. By providing a multipath or multilegged core having in effect an input leg, intermediate legs, and an output leg, an effective isolation between the input and the output legs is effected. A binary bit flux representation is normally entered into an input leg through the action of a current impulse through an inductively associated input winding, the impulse being applied to the input winding from a connected output winding of the preceding core, a current impulse being induced in this output winding by a reversal in flux direction in the related core leg. An isolation of the input and output windings of a core results from the multipath core construction and various windings thereon including a so-called transpose winding, which is used to perform the housekeeping function of resetting the input leg and setting the output legs of the core between the time the binary bit representation is entered into the core and later read out.

It is accordingly a broad object of the invention to provide a magnetic core shift register wherein each stage of the register utilizes a multipath core element of unique construction.

It is a further object of the invention to provide a magnetic core shift register having a multipath core element for each stage of the register and wherein spurious signal radiation forward and backward on a transfer of a binary bit from one order to the subsequent order is minimized.

It is a further object of the invention to provide a magnetic core shift register wherein each stage core is a multipath device having an input and an output leg, each with associated windings, and with intermediate legs through which isolation from the output and input circuitry is achieved at input and output time, respectively.

Another object of the invention is to provide a magnetic core shift register wherein each stage of the register includes a multipath core having input, output and intermediate legs and wherein a transpose winding is utilized to effect priming of an output leg so that it can carry a heavy ampere turn load at transfer time.

Another object of the invention is to provide a magnetic core shift register wherein each stage of the register includes a multipath core element having windings for effecting input, output, and housekeeping functions within the element.

Other objects of the invention will be pointed out in the following description and claims and illustrated in the accompanying drawings, which disclose, by way of example, the principle of the invention and the best mode, which has been contemplated, of applying that principle.

In the drawings:

FIG. 1 represents a typical hysteresis characteristic of one of the multipath cores used in the shifting register.

FIG. 2 is a schematic representation of one form of the multipath cores and shows the manner in which the main flux path is subdivided at each end thereof into 2 auxiliary flux paths to achieve a 4 legged core structure. FIG. 2 also shows the various windings associated with the various flux paths of the core.

FIG. 3 is a truth table which represents the six possible equilibrium flux states for the four legged core of FIG. 2, the designation 0 representing the flux when oriented in one direction in a leg, and the designation 1 representing the flux when in the opposite direction in a leg.

Figure 4A:
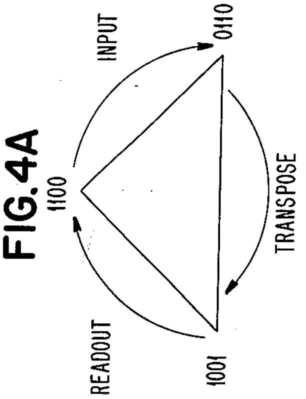
FIG. 4A is a diagrammatic representation of the manner in which the flux state condition of the legs of one of the multipath cores of the shift register change during the shifting of a binary bit representation therethrough.
Figure 4B:
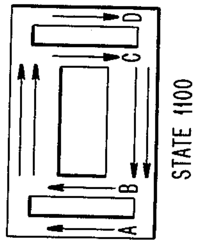

FIGS. 4B, C and D are diagrammatic representations of the flux line directions in the core in each of the three stable remanent state conditions a core may occupy in a shifting of a binary bit representation therethrough.

Figure 5:
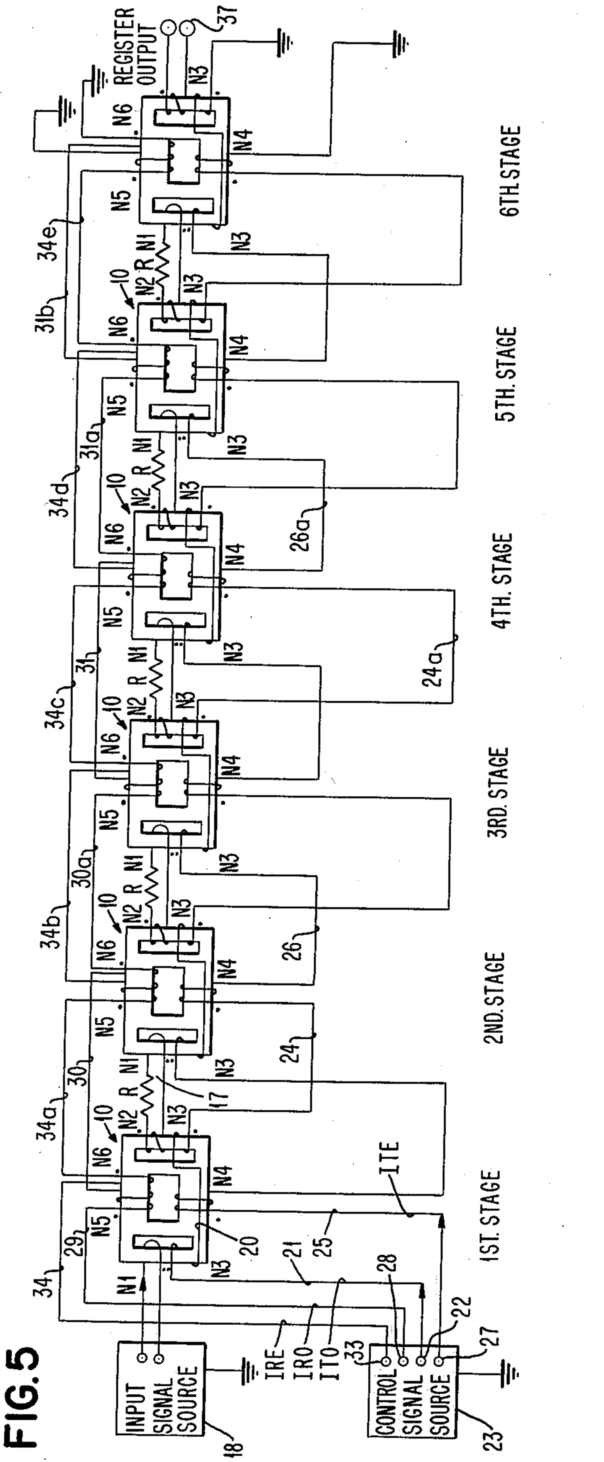

FIG. 5 is a circuit representation of 6 stages of a shift register utilizing the multipath cores as the principal circuit element.

Figure 6:
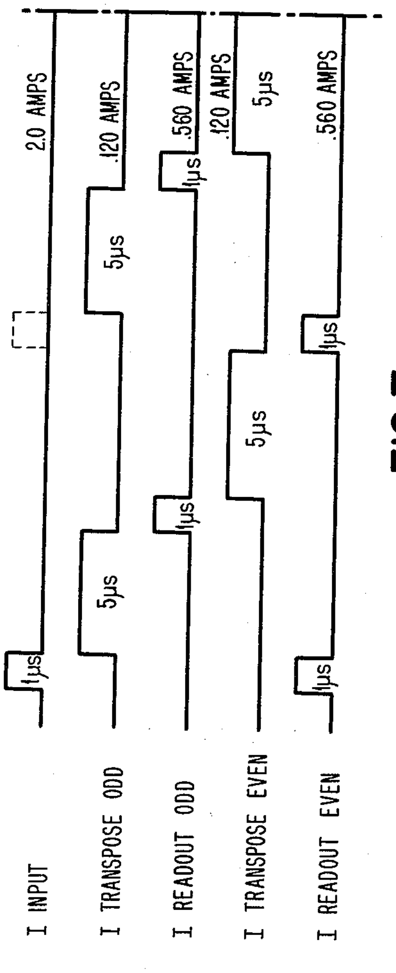

FIG. 6 is a timing chart of the pulse forms applied to the shift register in effecting a typical operation thereof.

Figure 7:
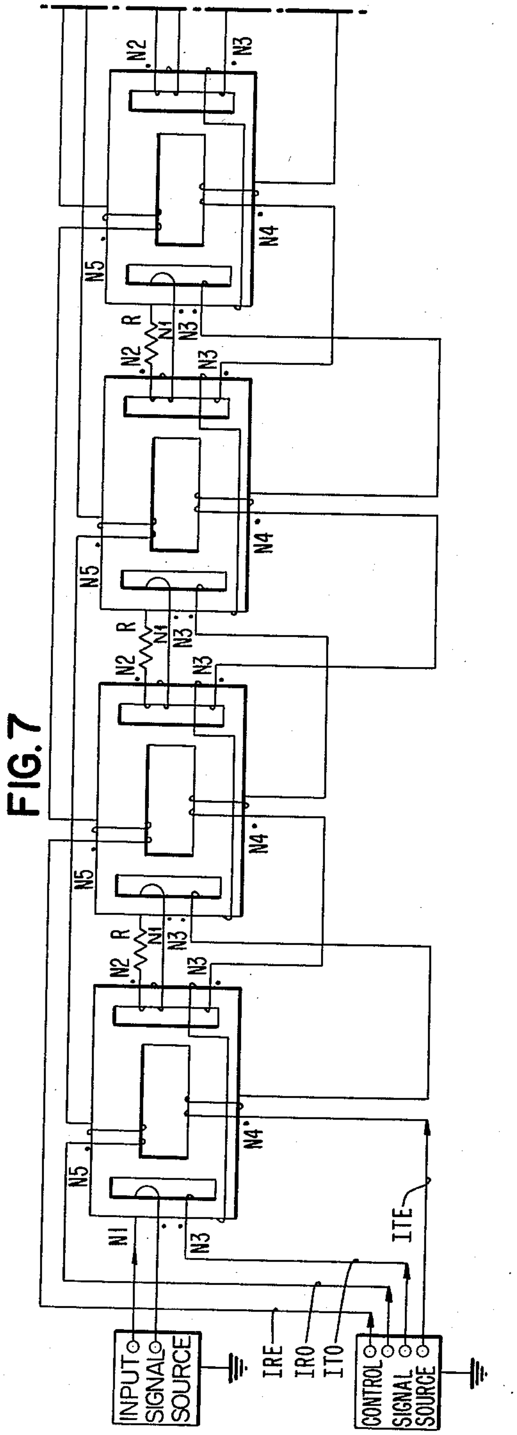

FIG. 7 is a circuit representation of a modified form of the shift register.

Referring now to FIG. 2 there is shown a rectangular core structure 10 having an opening 11 through the center section thereof and openings 12 and 13 through the left and right end section thereof, respectively, as indicated. The opening 11 defines, in effect, a main flux path, one body portion comprised of upper and lower sections 15 and 16, respectively, the main flux path being subdivided at its left end by opening 12 into 2 distinct segments or legs A and B, and similarly subdivided at its right end by opening 13 into 2 distinct segments or legs C and D. The segments or legs, A, B, C and D are all of equal cross sectional area while either portion 15 or 16 of the main flux path has a cross sectional area twice the cross sectional area of any one of the legs or segments A, B, C or D.

Binary inforation may be represented by stable states of remanence attained by magnetic materials and these states may be established by the application of appropriate magnetomotive forces. FIG. 1 represents a hysteresis loop of a ferrite such as used in the cores of the subject apparatus. Points $+B_r$ and $-B_r$ on the hysteresis characteristic shown in FIG. 1 indicate opposite states of remanence flux density and either of these two states may be selected as a datum condition. For example, if point $+B_r$ is selected as representing a binary one, then a binary zero is represented by remanence point $-B_r$. Under these above conditions and assuming an initial state $-B_r$, a binary one may be stored by applying a positive magnetizing force of an amount greater than the coercive force sufficient to drive the material into positive saturation $+B_s$ and then on a removal of the magnetizing force, the material returns to the positive remanent flux position $+B_r$.

A binary zero representation may be stored by failure to apply a positive magnetomotive force of sufficient strength or by applying a force in the negative sense to cause the loop to be traversed from point $-B_r$ to $-B_s$ and then back to point $-B_r$ when the force terminates. To change the state of the core from 1 to zero or zero to 1 as the case may be, a force of the proper polarity and of sufficient intensity is applied to traverse the loop from the original remanent state $+B_r$ or $-B_r$ to saturation in the proper direction, and then upon removal of the force, the flux relaxes to the desired remanent state. It will be noted in FIG. 1 that the hysteresis loop is nearly rectangular and that as a result, the remanent flux density $-B_r$ or $+B_r$ is substantially equal to the related saturation flux density $-B_s$ or $+B_s$.

The state of a core may be sensed or read out by applying a negative magnetomotive force sufficient to exceed the coercive force of the material. If a binary one has been stored, a large flux reversal occurs as the flux density is driven from $+B_r$ to $-B_s$. This change is manifested by a large voltage induced in a sense winding on the core. The readout of a binary zero, on the other hand, results in a very small voltage on a sense winding due to the small change in flux as the flux in the core is driven from $-B_r$ to $-B_s$. The statements made above in relationship to the magnetic properties of the core material, and to binary data storage and readout, are to serve as background information for the following description of the operation of the multipath cores utilized in the subject shift register. Each of the multipath cores 10 is constructed of a ferrite material having a hysteresis loop as indicated in FIG. 1, and the properties of the loop explained above.

It is convenient to express the condition of the remanent flux in each leg or path A, B, C or D of the core 10 in terms of the direction of the flux in that leg. Thus, if the flux in the legs A and B is in an upward direction, and the flux in legs C and D is in a downward direction, this fact can be expressed in a shorthand fashion by letting the digit 1 stand for the upward directions and the digit 0 represent the downward direction. The above condition of the multipath core is then represented by the digits 1100 and the flux distribution would be as shown in FIG. 4B. Six states are possible for the 4 legged cores, as shown in the truth table in FIG. 3. The continuity of the flux lines in the core requires that the number of legs switched in an upward direction must always equal the number switched in a downward direction.

Referring now to FIG. 5 there is shown 6 orders of the shift register with each order including one of the previously described 4 legged cores. It will be noted in FIG. 5 and also in FIG. 2 that inductively linked with the leg A of each core is a so-called input signal winding N1. Similarly, inductively linked with the leg D of each core is an output signal winding N2. A separate so-called transpose winding N3 is inductively linked with each of the A and D legs of a core as shown. Further windings provided for each core are a so-called hold or bias winding N4 inductively associated with the main flux path, a so-called readout or reset winding N5 inductively associated with the main flux path of the core, and another bias winding N6 also inductively associated with the main flux path of the core. Each bias winding N4 is utilized to effect a "holding" or a preventing of the switching of the associated core under certain circumstances, while the bias windings N6 have an opposite purpose in that they aid or assist the switching of the associated core state under certain circumstances. The diverse purposes of the bias windings N4 and N6 will be later evident. Each of the windings N1 through N6 has a number of turns as follows:

N1—2 turns
N2—4 turns
N3—10 turns
N4—5 turns
N5—20 turns
N6—2 turns

The output winding N2 of each of the cores is connected by conductors 17 to the input winding N1 of the succeeding core. The resistance R indicated is actually the wire resistance and in the embodiment shown in about 0.56 ohm. A binary bit signal representation is entered into the first stage or core of the shift register from any well known type of signal source designated as 18. In the embodiment shown the source 18 provides electronic input signals of 1 microsecond duration and 2.0 amps magnitude as represented by the upper waveform in FIG. 6. The data bit signals are generated and applied serially on the representative time base as indicated. Each data bit representation is then shifted or advanced to the succeeding stage of the register during the time interval before the next possible data bit may be entered into the register. Thus in the 6 stage register shown in FIG. 5, it would require a time interval equivalent to 3 intervals between possible data bits until a data bit entered into the first stage core, appears as a data bit representation in the output leg of the 6th stage core. The manner in which a data bit is entered and shifted, will be later explained in detail.

Referring again to FIG. 5, it will be noted that the so-called transpose windings N3 associated with the legs A and D of each core are connected in series by linking the one end of each of the windings through a connection 20. The free end of the transpose winding N3 of the A leg of the first order core (from left in FIG. 5) is connected through a conductor 21 to an output terminal 22 of a control signal source 23. A so-called $I_{TO}$ (transpose odd stage cores) current pulse of 5 microseconds duration and .120 amps magnitude is generated in the control signal source 23 in any well known way and appears on terminal 22. The wave form of the $I_{TO}$ pulse is shown in FIG. 6. The free end of the transpose winding N3 of the D leg of the first stage (from left in FIG. 5) core is linked by a conductor 24 to the one end of the hold or bias winding N4 of the second stage core. The other end of this N4 winding is connected, in turn, through a conductor 26 to the free end of the N3 winding of the A leg of the 3rd stage core. The free end of the N3 winding of the D leg of the latter core is connected to the hold winding N4 of the 4th stage core through conductor **24*a* in the same manner as in the 1st and 2nd stage cores. The other end of the N4 winding of the 4th stage core is connected to the N3 winding of the A leg of the 5th stage core through a conductor 26*a*, in the same manner as the connection between the 2nd and 3rd order cores. The free end of the N3 winding of the 5th stage core is connected, in turn, to the one end of the N4 winding of the 6th stage core, the other end of this latter winding being connected to ground. It is thus evident that a series circuit extends from the terminal 22, through the N3 or transpose windings of the 1st stage core, the hold or bias winding N4 of the 2nd stage core, the N3 windings of the 3rd stage core, the hold winding N4 of the 4th stage core, the transpose windings N3 of the 5th stage core, and finally through the winding N4** of the 6th stage core to ground.

A similar series circuit extends from an output terminal 27 of the control signal source 23, through a conductor 25 through the bias or hold winding N4 of the 1st stage core, the transpose windings N3 of the 2nd stage core, the bias winding N4 of the 3rd stage core, the transpose windings N3 of the 4th stage core, the bias winding N4 of the 5th stage core, and finally through the transpose winding N3 of the 6th stage core to ground. A so-called $I_{TE}$ (transpose even order cores) current pulse of a 5 microseconds duration and waveform as indicated in FIG. 6 and also of a .120 amp magnitude, is generated by the control signal source 23 and appears on terminal 27 from which it is applied to the previously traced circuit.

Referring again to FIG. 5, two additional series circuits are provided, one for the odd stage cores of the register and one for the even stage cores of the register. The first extends from a so-called $I_{RO}$ (read odd) terminal 28 of the control signal source 23, through a conductor 29 through the read winding N5 of the 1st stage core, through a conductor 30, through the bias winding N6 of the 2nd stage core, through a conductor 30a, through the read winding N5 of the 3rd stage core, through a conductor 31, through the bias winding N6 of the 4th stage core, through a conductor 31a, through the read winding N5 of the 5th stage core, through a conductor 31b, and finally through the bias winding N6 of the 6th stage core, to ground. The other series circuit extends from a so-called $I_{RE}$ (read even) terminal 33 of the control signal source 23, through a conductor 34, through the bias winding N6 of the 1st stage core, through a conductor 34a, through the read winding N5 of the 2nd stage core, through a conductor 34b, through the bias winding N6 of the 3rd stage core, through a conductor 34c, through the read winding N5 of the 4th stage core, through a conductor 34d, through the bias winding N6 of the 5th stage core, through a conductor 34e, and finally through the read winding N5 of the 6th stage core to ground. A so-called $I_{RO}$ (read odd cores) current pulse of .560 amp magnitude, 1 microsecond duration, and of a waveform as designated in FIG. 6, is generated in the terminal 28 by the signal source 23 and applied to the associated circuit traced previously. Similarly, a so-called $I_{RE}$ (read even) current pulse of .560 amp magnitude, 1 microsecond duration, and of a wave form as also designated in FIG. 6, is generated on the terminal 33 by the signal source and applied therefrom through conductor 34 to the previously traced circuit. The purpose of these latter circuits will also be later evident. It will be noted in FIG. 5 that each of the windings in a core has a dot at one terminal thereof. Current flowing into a coil at a dot-marked terminal is assumed to produce a magnetomotive force in the associated core portion which will drive it towards its 0 remanent condition.

Prior to the entry of any binary data representations into the shift register, all core orders thereof are in a reset condition of 1100 as indicated in FIGS. 4A and 4B, this designation meaning, as previously described, that the flux in legs A and B is upward, while the flux in legs C and D is downward, as indicated. The manner in which this reset state is effected will be later evident, consequently the discussion will proceed on the basis of an assumption that all cores are reset to the 1100 state. As was mentioned previously, the control signal source 23 generates signals on the associated terminals 22, 27, 28 and 33, in any well known way, which are of a magnitude, waveform, time duration, and timed relationships as indicated in FIG. 6. Signals representative of binary data representations are applied to the N1 winding of the 1st stage core of the register. The input signal source and the control signal sources are synchronized relative to each other in any one of various known ways so that when a binary one is to be read into the register, an input signal designated as $I_{Input}$ is applied only at a time in relationship to the operation of the control signal source 23, as indicated in the waveform chart of FIG. 6. An Input pulse, which is representative of a binary one, is of 2.0 amps magnitude and 1 microsecond duration, as indicated. The winding N1 of the 1st stage core is properly poled, as indicated, so that with the application of the input signal thereto from the source 18, a downward flux is impressed in leg A of the core. The magnetizing force is such as to overcome the previous upward flux state of the A leg and shift this leg to the downward direction remanent flux state. This magnetizing pulse or input may be defined as a 0XXX pulse, indicating that leg A is driven in a downward direction, and that no pulse was applied to the other three legs.

Figure 4C:
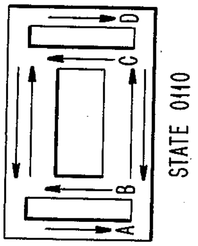
Figure 4D:
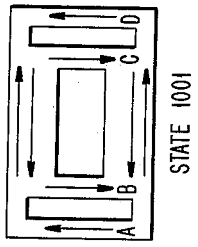

When leg A is switched, one of the remaining legs must also be reversed in order to satisfy one of the six possible states of the core (FIG. 3). Since leg B is already in the upward direction either leg C or D must be switched. Since the flux path between legs A and C is shorter than between legs A and D and consequently has a higher field intensity, leg C is the leg switched. The input driving pulse must be of a sufficient amplitude to overcome the switching threshold of the path between legs A and C. No reversal in flux takes place in leg D at this time and consequently the input winding N1 and output winding N2 of the core remains effectively isolated. At the end of the input pulse, the 1st stage core will accordingly be in a 0110 state, as represented in FIG. 4C.

Referring now to FIG. 6 it will be noted that shortly after the 1st stage core is switched to its 0110 as a result of the input signal $I_{Input}$, the so-called $I_{TO}$ (transpose odd stage cores) pulse is generated on terminal 22 and is applied through conductor 21 to the N3 windings inductively associated with the A and D legs of the 1st stage core, through the conductor 24, through the bias winding N4 of the second stage core, etc. as previously described. This current pulse through the N3 windings of the 1st stage core, impresses a magnetomotive force of sufficient magnitude in the A and D legs of the core, to reverse the direction of the flux from downward to upward in these legs. At transpose time as the flux in the A and D legs of the 1st stage core reverses, the reversal induces a voltage in the associated output winding N2 of leg D, and the input winding N1 of leg A. The voltage induced in the output winding N2 affects a circulating current in the loop linking the N2 winding to the N1 winding of the succeeding core, but this circulating current is in a direction which does not tend to switch the second core.

The voltage induced in the input winding of the 1st stage core by the flux reversal thereof at Transpose odd core time, is of no consequence to the signal source 18. However, if it had been the 3rd stage core, for example, in which this transpose action was taking place, the voltage induced in the related input winding N1 would be applied therefrom to the loop linking the N2 winding of the 2nd or preceding stage core and would tend to effect a spurious switching of the D leg of this preceding core from a zero towards a one representative state. This spurious switching is prevented, however, by reason of the transpose pulse being also supplied through the previously traced series circuit to the N4 windings, of the 2, 4 and 6th stage cores. The N4 windings on these cores are properly poled to nullify the magnetizing force applied to an output leg of the 2nd, 4th and 6th stage through associated winding N2 as a result of a flux reversal in the input leg of the succeeding stage core. Since all of the transpose windings of the odd stage cores are part of the common series circuit previously traced, the speed of operation of the transpose operation is limited by the maximum drive that can be applied to leg D of these odd stage cores, without upsetting any odd stage core in the 1100 state. At the end of the transpose odd pulse in our above example, the 1st stage core is in the transposed state 1001, while the remaining stage cores are still in their original reset state 1100.

Although the transpose windings effect the transpose action directly on the A and D legs or paths of a core, as described above, it will be appreciated that the transpose action may be effected by having the transpose winding acting instead, directly on the intermediate legs B and C, the reversal in flux of these intermediate legs, in turn, effecting a desired reversal in flux of the input and output legs A and D. The applicant's invention is accordingly not limited to the particular arrangement of transpose windings indicated in the drawings. The essential thing is that the field applied by the transpose winding to a set core be such as to reverse the flux in the associated input and output legs or paths A and D to put the core in the 1001 state.

Referring now to FIG. 6 it will be noted that shortly after the fall of the $I_{TO}$ current pulse on terminal 22 of the signal source 23, a so-called $I_{RO}$ (read odd cores) pulse is generated on terminal 28 of the signal source. This pulse is applied therefrom through the N5 windings of the odd stage cores as previously described. The $I_{RO}$ pulse applied to the N5 windings of the associated cores already in their reset state (3rd and 5th cores) has no effect thereupon. However, in the 1st stage core, the magnetomotive force applied to the main body portion of the core as a result of this pulse $I_{RO}$ effects a reversal of flux in the B and D legs, the flux being shifted downward in leg D, and upward in leg B. This reversal induces a voltage in the output winding N2 which links leg D of the 1st stage core and sets up a clockwise current in the loop linking the N1 winding of the 2nd stage core with this winding. This current in the N1 winding of the 2nd stage core forces a reversal of flux in the leg A of this core, and also in leg C thereof in the same manner as described for the original read in operation from the input signal source 18 for the 1st stage core. Through the series circuit previousy traced, it is evident that the $I_{RO}$ pulse applied to the N5 windings of the odd stage cores, is also applied to the bias windings N6 of the even stage cores. The bias windings N6 are properly poled in relationship to their associated cores so that the magnetizing effect is additive in relationship to the magnetizing effect of associated input winding N1 on the transferring of a binary one from the preceding core and contributes to increasing the speed with which the transfer is effected.

The reversal of the flux direction in the B and D legs of the first stage core as a result of the $I_{RO}$ pulse accordingly switches the state of the 1st stage core back to the reset condition 1100 (FIG. 4B). It will be noted that during readout or reset time of a core, no change of flux takes place in leg A thereof and consequently there is no possibility of back transfer. By the entire above described sequence of events, a binary one representation was initially read into the first stage core and then shifed to the second stage core. The second stage core is accordingly now in a 0110 state, while the remaining cores are in the reset state 1100.

Shortly after the second stage core is shifted to its 0110 state as a result of the application of the $I_{RO}$ pulse to the 1st stage core, a so-called $I_{TE}$ (transpose even) current pulse as indicated in FIG. 6, appears on terminal 27 of the control signal source 23 and is applied through conductor 25 to the previously traced series circuit of bias windings N4 of the odd stage cores and transpose windings N3 of the even stage cores. This transpose pulse, in the same manner as previously described for 1st stage core, alters the state of the second stage core from its previously assumed 0110 state to the 1001 state. The change of flux of the A and D legs of this core and its effect through the associated input winding N1 to the output winding N2 on the preceding core is nullified, of course, by action of the bias windings N4 on the 1st stage core, the N4 windings of the odd stage cores being subjected to the same pulse that effected the even transpose operation, in the same manner as previously described.

With the 2nd stage core now in its 1001 state, for our particular example, the subsequent appearance of an $I_{RE}$ (read even) pulse (see FIG. 5) on terminal 33 of the control signal source 23 effects through the conductor 34 and the readout winding N5 of the 2nd stage core etc., as previously traced, a transferral of the 2nd stage core from its 1001 state back to its original reset state 1100. This resetting action effects, in the same manner as previously described for the 1st stage core, the generation of an output signal indication on associated winding N2, this signal being applied to the input winding N1 of the subsequent core to transfer it from its binary zero or reset state 1100 to its binary 1 representative state 0110. From the timing chart in FIG. 6 it will be evident that at the same time that the binary one representation is shifted from the 2nd stage core to the 3rd stage core, another binary one signal representation may be loaded into the first core from the input signal source 18 is desired. The above description was confined to the entry of a binary one to the 1st stage core and its shifting through the 2nd stage core to the 3rd stage core, all of the cores having been assumed in the reset state (1100) prior to the actual entry operation. By reason of the serial continuity of the various signal paths from the source 23 through the entire register, as previously traced in detail, it is obvious that if the 3rd stage core had been in a binary one representative state (0110), rather than the reset state (1100) at the time the binary one signal was read into the 1st stage core, this binary one bit representative indication would have been shifted from the 3rd through the 4th to the 5th stage core, simultaneous with the shifting of the binary one signal representation from the 1st stage, through the second, to the 3rd core. On each complete cycle of the signal source 23, as indicated in FIG. 5, any one of the odd cores of the shift register having a binary one represented therein (0110 state) has this representation, shifted to the next even numbered core and then to the subsequent odd numbered core. This shifting of data continues for each cycle of the signal source 23, with each binary one signal representation eventually being shifted out of the last order core, and generating a corresponding signal on the output terminals 37 of the last core. The binary one representative output signals generated serially on the output terminals may be utilized in any desired manner. If desired the output from the last stage of the register could be fed back to the input of the first stage to effect a closed ring type of operation. In this latter type of operation, the ring could be utilized to generate a timing pulse or pulses for any desired use at any desired time interval or intervals of each cycle of the ring. This type of operation is well known to those familiar to the art.

It is evident from the above description that the $I_{TO}$ and $I_{RO}$ impulses as applied to their respective series circuits effect a transposing and reading out, respectively, of the bit data in the odd stage cores and in entirety, may be considered as a first group or line of shift or advance circuitry. Similarly, the $I_{TE}$ and $I_{RE}$ impulses as applied to their respective series circuit effect a transposing and reading out of the bit data in the even stage cores and in entirety, may be considered as a second group or line of shift circuitry. The two shift line circuits by their sequential operation, accordingly, shift or advance each binary one represented in the register through two stages. This type of operation is usually referred to as a two line shift register operation.

As another way of regarding the register, the odd numbered cores may be defined as the main storage cores since they hold the binary one representations at the end of each complete cycle of the control signal source. Regarding the register in this manner, the even numbered cores may be considered to be temporary storage cores (since they temporarily hold the binary core representation during each cycle), or simply as coupling or transfer cores between the main storage cores.

Referring now to FIG. 7, there is shown an alternate form of the register, only 4 representative stages of the register being shown. This register is identical with the register shown in FIG. 5 with this exception. The bias windings N6 are eliminated. It will be recalled that windings N6 are utilized to assist in the transfer of the binary one representation from one core to the succeeding stage core, to permit faster operation. The sequence of operation in the modified register of FIG. 7 is identical to the operation of the initially described register with the following exception. On a reading out or resetting of the output leg D of a core, the resulting circulating current in the loop composed of the N2 winding of that "readout" core and the N1 input winding of the succeeding core must effect, by itself, the entry of the binary one representation into the last mentioned core.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A magnetic shift register comprising a series of magnetic cores, each said cores comprising a closed magnetic circuit having a main body portion surrounding a control aperture, the main body containing two smaller apertures, one dividing the body into first and second legs and the other dividing the body into third and fourth legs, an input winding associated with the first leg of each core, an output winding associated with the fourth flux path of each core, transpose winding means associated with said first and fourth flux paths of each core, bias winding means associated with the main flux path of each said cores, a reset winding associated with the main flux path, circuit means linking the output winding of each core to the input winding of the succeeding core, a first electrical circuit including connections serially linking the transpose windings of the first core of said series, the bias winding of second core, the transpose windings of the third core and so forth, a second circuit means serially linking the reset windings of the odd numbered cores of said series, a third electrical circuit including connections serially linking the bias winding of the first core of said series, the transpose winding of the second core of said series, the bias winding of the third core of said series and so forth, fourth circuit means serially linking the reset windings of the even numbered cores of said series, a current input signal source means feeding the input winding of said first core of said series, said input winding being responsive to a binary bit representative current impulse applied thereto to switch the flux direction in said associated first flux path from a first predeterminel condition to the opposite condition and also effect through said main flux path an attendant switching of the flux direction in said third flux path, to effect a binary one representative setting of said first core, cyclically operating control signal source means for generating serially on separate outputs first, second, third and fourth current impulses, said first current impulse being applied to said first circuit subsequent to the application of an input signal, said first current impulse through said circuit reversing the flux direction in said first and fourth flux paths of the previously set first core of said series, said second current impulse from said source being subsequently applied through said second circuit and effecting through said associated reset winding of said first core, a flux reversal in the related second and fourth flux paths of said first core, said flux reversal generating in the related output winding of said first core a current impulse which is transmitted therefrom to the input winding of the second core of said series of cores and effect a binary one bit representative setting of said second core by reversing the flux direction in the related first and third flux paths in the same manner as the original input signal acted on said first core, said third current impulse being applied to said third series circuit and effective in said second core of said series in the same manner as said first current impulse on said first core of the series to transpose the magnetic state thereof, said third current impulse also acting through the bias winding of said first core of the series and nullifying any effect of the flux reversal in said second core as effective through the associated input winding of the second core to the output windings of the first core, said fourth current impulse being applied to said fourth series circuit and effective on said second core in the same manner as said second current impulse on said first core to read out said second core to a third core of said series, each complete cycle of said signal means shifting any binary bit representation in said register through two cores and wherein a new binary bit representation may be loaded into said first core from said input signal source and shifted two core positions on each said cycles.

2. A shift register comprising, in combination, a series a multi-apertured core transfer devices, each device comprising, a magnetic core having a main body surrounding an aperture, the body being subdivided by a pair of apertures to form four segments, an input segment, an output segment, and two intermediate segments, each of said segments being of equal cross section with the main body being of twice the cross sectional area of anyone of said segments, said core being adapted to be switched to any one of a number of stable magnetic states, input winding means inductively associated with the input segment of said core and adapted when impulsed to switch the state of the core from a first to a second state, means for impulsing said input winding of the first core of said series when entry of a data bit into said register is desired, transpose winding means inductively associated with said core and adapted when impulsed and with said core in said second state to switch it to a third state, means for impulsing said transpose winding means, reset winding means inductively associated with said core end adapted when impulsed and when said core is in said third state to reset said core to said first state, means for impulsing said reset winding means, and output winding means inductively associated with said output segment and adapted to generate an output pulse on a switching of said core from said third to said first state and means connecting the output winding means of a core to the input winding means of the succeeding core input to effect by said output pulse a switching thereof from said first to said second state.

3. Apparatus as in claim 2 further characterized in that said transpose winding is inductively associated with said input and output segments to effect, when impulsed, a switching of said core if in said first state to said second state.

4. Apparatus as in claim 2 further characterized in that said transpose winding is inductively associated with said intermediate segments to effect, when impulsed, a switching of said core if in said first state to said second state.

5. A magnetic shift register comprising, in combination, a series of multi-apertured magnetic cores, each said cores comprising a continuous magnetic circuit having a main section surrounding an aperture which subdivides by further apertures therein into first, second, third and fourth segments, each of said cores being capable of being switched to anyone of a plurality of possible stable magnetic states, input winding means associated with the first segment of each said cores and adapted when current impulsed to switch the state of said core from a first predetermined one of said states to a second predetermined state, output winding means associated with the fourth segment of each said cores, the output winding of each said cores but the last being electrically linked to the input winding of the succeeding core of said series, impulse responsive first circuit means including individual transpose winding means associated with the odd numbered cores of said series and individual bias winding means associated with the even numbered cores of said series, said transpose windings being effective upon an impulsing of said associated circuit to effect a switching of the state of anyone of said odd numbered cores in said second predetermined state to a third predetermined state, and said bias winding being effective upon an impulsing of said first circuit means to nullify any flux reversing energy change applied through said output winding-input winding linkage of associated cores to maintain the state of said even numbered cores unaltered, impulse responsive second circuit means including individual reset windings associated with the odd numbered cores of said series, said windings being effective upon an impulsing of said second circuit means to effect a switching of said core if in said third predetermined state to said first state, said switching effecting a switching of the succeeding even core from said first to said second state, third impulse response circuit means identical to said first circuit means except including the individual transpose winding means associated with the even numbered cores of said series, and individual bias winding means associated with the odd numbered cores of said series, said windings being individually effective in their related core upon an impulsing of said associated circuit means in a manner similar to said first circuit means, impulse responsive fourth circuit means including individual reset windings associated with the even numbered cores of said series, said windings being effective in said related cores in a manner similar to said reset windings of said second circuit means on said odd numbered cores, an input impulse source means feeding the input winding of said first core of said series and applying impulses thereto serially with each impulse being representative of a bit of data, and a cyclically operating impulse source means applying serially impulses to said first, second, third and fourth circuit means, each complete cycle of said cyclically operating means shifting any data bit representation two core positions from its position at the beginning of said cycle, and wherein a new data bit may be entered into said register and advanced two core positions in each of said cycles.

6. A magnetic shift register comprising, in combination, a series of multi-apertured magnetic cores, each said cores comprising a closed magnetic circuit having a main body a portion of which is divided into first and second segments and a further portion divided into third and fourth segments each of said segments being of equal cross section with the main body having twice the cross sectional area of any one of said segments, each of said cores being capable of occupying a number of stable magnetic states, an input winding means associated with the first segment of each said cores and normally responsive to a current impulse applied thereto to switch the core from a first predetermined state to a second state, a current impulse source feeding the input winding of the first core of said series, each impulse being representative of a data bit, an output winding means associated with the fourth segment of each said cores, electrical circuit connections between the output winding of a core and the input winding of the succeeding core of said series, said connection means upon a switching of the preceding core from a third to said first state transmitting an impulse to the succeeding core input winding to normally effect switching thereof from said first to said second state, transpose winding means associated with each said cores and adapted when current impulsed and if said related core is in said second state to switch it to said third state, a bias winding associated with the main body portion of each said cores and adapted when current impulsed to prevent any change in the flux direction in said core, a read winding associated with the main body of each said cores and adapted when current impulsed to switch the core if in said third state to said first state, first electrical circuit means linking the transpose windings of each of the odd numbered cores of said series and the bias windings of said even numbered cores in a serial manner, second electrical circuit means linking the read windings of said odd numbered cores in a serial fashion, third electrical circuit means linking the bias windings of each of the odd numbered cores of said series and the transpose windings of said even number cores in a serial manner, fourth electrical circuit means linking the read winding of said even numbered cores in a serial fashion, and a cyclically operating control signal source means applying a current impulse to each of said series circuits in sequence during each cycle thereof, a complete cycle of said signal source being effected for each possible data bit fed to said input winding of the first core.

7. A magnetic shift register comprising, in combination, a series of magnetic cores, a coupling core for each adjacent pair of cores of said series, all of the cores being of similar construction each comprising a continuous magnetic circuit having a main body section a portion of which is divided by an aperature therein into first and second segments and another portion thereof divided by an aperture therein into third and fourth segments, each of said segments being of equal cross section with the main body section being of twice the cross sectional area of any one of said segment legs, each of said cores being adapted to be switched to any one of a number of stable magnetic states, all of said cores being initially in a first predetermined state, input means inductively associated with the first segment of each said cores and adapted when impulsed to switch the state of the related core from said first to a second predetermined state, input signal source means feeding current impulses serially to the input winding of the first core of said series, each impulse being representative of a data bit, output winding means inductively associated with the fourth segment of each said cores, electrical connection means linking the output winding of each core of said series but the last to the input winding of the succeeding core, said connection means serving upon a switching of the core from a third back to said first predetermined state to transmit a current impulse generated in the output winding to the input winding of the next core to effect a setting of the latter core from said first to said second state, a first impulse responsive series circuit including individual transpose windings inductively associated with the first and fourth segments of each core of said series and individual bias winding inductively associated with each coupling cores, said transpose windings being effective upon an impulsing of said first circuit to effect a switching of said related cores if in said second state to said third state, with said bias windings being simultaneously effective to prevent a switching of the related coupling cores, a second impulse responsive circuit including a reset winding inductively associated with each said cores of said series, said latter windings being effective upon an impulsing of said second circuit to effect a switching of said associated cores if in said third state to said first state, a third impulse responsive circuit including individual transpose windings inductively associated with the first and fourth segments of each coupling core and individual bias windings inductively associated with each coupling core of said series, said transpose windings being effective upon an impulsing of said third circuit to effect a switching of said related core if in said second to said third state, with said bias windings being simultaneously effective to prevent a switching of said related coupling cores; a fourth impulse responsive circuit including a reset wnding inductively associated with each said coupling cores, said latter windings being effective upon an impulsing of said fourth circuit to effect a switching of said associated cores if in said third state to the first state, and cyclically operating impulse signal generating means driving said first, second, third and fourth circuit sequentially, there being one cycle of said generating means for each possible data bit representative impulse fed to said first core.

8. A magnetic shift register comprising, in combination, a series of multi-apertures magnetic cores, each of said cores having a main closed body portion surrounding an aperture and which is subdivided by other apertures therein to form four segments, an input segment, an output segment, and two intermediate segments, each said segments being of equal cross section with the main body portion being of twice the cross sectional area of any one of said segments, each of said cores having input winding means inductively associated with the input segment thereof, output winding means inductively associated with the output segment thereof, individual transpose winding means inductively associated with each said cores, individual bias winding means inductively associated with each said cores, and individual reset winding means inductively associated with the main body portion of each said cores; circuit means linking the output winding of each said cores but the last of said series to the input winding means of the succeeding core, a first circuit including means serially linking the transpose windings of the odd numbered cores of said series and the bias windings of the even numbered cores, a second circuit including means serially linking the reset windings of the odd numbered cores of said series, a third circuit including means serially linking the transpose windings of the even numbered cores of said series and the bias windings of the odd numbered cores, a fourth circuit including means serially linking the reset windings of the even numbered cores of said series, impulse signal source means driving said first, second, third and fourth circuit sequentially in repeating cycles, and input signal source means for feeding a data bit representative impulse to the first core input winding at the beginning of any cycle of said impulse signal means.

9. A two line magnetic shift register comprising, in combination, a series of magnetic cores designated alternately as odd and even cores, the first core of said series being an odd core, each of said odd and even cores having a main body portion surrounding an aperture, the main body portion containing two smaller apertures which divide the adjacent body portion into four segments, an input segment, an output segment, and two intermediate segments, each said segments being of equal cross section with the main body portion having twice the cross sectional area of any one of said segments, each of said cores having input winding means inductively associated with the input segment thereof and output winding means inductively associated with the output segment thereof, individual transpose winding means inductively associated with each core of said series, individual bias winding means inductively associated with each core of said series, and individual reset winding means inductively associated with each core of said series, each of the cores of said series being adapted to occupy any one of a plurality of stable magnetic states, circuit means linking the output winding of each said cores but the last of said series to the input winding means of the succeeding cores, an odd core shift line circuit arrangement comprised of a first series circuit including means serially linking the transpose windings of the odd core and the bias windings of the even cores, and a second circuit including means serially linking the readout windings of the odd cores; an even core shift line circuit arrangement comprised of a third series circuit including means serially linking the transpose windings of the even cores and the bias windings of the odd cores, and a fourth circuit including means serially linking the readout windings of the even cores; input signal source means feeding the input winding of the first odd core of said series, said input source means applying impulses serially to said input winding, each impulse being representative of a data bit and effecting a setting of said related core from a first predetermined one of said stable states to a second predetermined one of said stable states, control signal source means impulsing said first series circuit, second series circuit, third series circuit and fourth series circuit sequentially, in repeating cycles, the impulsing of said first series circuit effecting a setting of any related odd core in said second predetermined state to a third predetermined state, the impulsing of said second series circuit effecting a resetting of any related odd core in said third predetermined state back to said first predetermined state, said resetting through the associated output winding and the input winding of the next even core, effecting a setting of the latter from said first predetermined state to said second predetermined state, the combined action having shifted any data bit representation in an odd core one position, the impulsing of the third series circuit and the fourth series circuit effecting similarly a shifting of any data bit representation in an even core one core position.

10. A magnetic shift register comprising, in combination, a series of magnetic cores, each of said cores comprising a closed magnetic circuit having a main body portion surrounding an aperture, the body containing two other smaller apertures which divide the adjacent body section into four legs, an input leg, an output leg, and two intermediate legs, each of said legs being of equal cross section with the main body being of twice the cross sectional area of any one of said legs, each of said cores having an input winding means inductively associated with the input leg thereof, output winding means inductively associated with the output leg thereof, transpose winding means inductively associated with the input and output legs thereof, first bias winding means inductively associated with the main body portion thereof, second bias winding means inductively associated with the main body portion thereof, and reset winding means inductively associated with the main body portion thereof, circuit means linking the output winding of each said cores but the last of said series to the input winding means of the succeeding core, a first circuit including means serially linking the transpose windings of the odd numbered cores of said series and said first bias windings of the even numbered cores, a second circuit including means serially linking the reset windings of the odd numbered cores and said second bias windings of the even numbered cores, a third circuit including means serially linking the transpose windings of the even numbered cores of said series and said first bias windings of the odd numbered cores, a fourth circuit including means serially linking the reset windings of the even numbered cores and said second bias windings of the odd numbered cores, impulse signal source means driving said first, second, third and fourth circuits sequentially in repeating cycles and input signal source means for feeding a data bit representative impulse to the first core input winding at the beginning of any cycle of said impulse signal means.

11. A magnetic shift register comprising, in combination, a series of magnetic cores, each said cores comprising a closed magnetic circuit having a main body portion surrounding an aperture, the main body portion containing two smaller apertures, one of which divides the body into first and second segments and the other dividing the body portion divided into third and fourth segments, each of said segments being of equal cross section with the main body portion having twice the cross sectional area of any one of said segments, each of said cores being capable of occupying a number of stable magnetic states, an input winding means inductively coupled to the first segment of each said cores, and normally responsive to a current impulse applied thereto to switch the core from a first to a second magnetic state, a current impulse source feeding the input winding of the first core of said series, each impulse being representative of a data bit, an output winding means inductively coupled to the fourth segment of each said cores, electrical circuit connections linking the output winding of a core and the input winding of the succeeding core of said series, said connections transmitting an impulse induced in an output winding on a switching of the associated core from a third back to said first magnetic state to the succeeding core input winding to effect a switching of the latter from said first to said second magnetic state, a transpose winding means associated with said first and fourth segments of each core and adapted when current impulsed to switch the associated core if in said second state to said third state, a first bias winding associated with the main body portion of each said cores and adapted when current impulsed to prevent any change in the magnetic state of said core, a second bias winding associated with the main body portion of each said cores and adapted when impulsed to aid in the switching of that core from said first to said second state, a reset winding associated with the main body portions of each said cores and adapted when current impulsed to switch said core if in said third state back to said first state, a first series circuit means connecting the transpose windings of each of the odd numbered cores of said series and said first bias windings of said even numbered cores in a serial manner, second series circuit means connecting the reset windings of said odd numbered cores and said second bias windings of said even numbered cores in a serial manner, third series circuit means connecting the transpose windings of each of the even numbered cores of said series and said first bias windings of said odd numbered cores in a serial manner, fourth series circuit means connecting the reset windings of said even numbered cores and said second bias windings of said odd numbered cores in a serial manner, and a cyclically operating control signal source means applying a current impulse to each of said first, second, third and fourth series circuit in sequence during each cycle thereof, a complete cycle of said signal source being effected for each possible data bit feed to said input winding of the first core of the series.

References Cited in the file of this patent

UNITED STATES PATENTS

| | | |
|---|---|---|
| 2,803,812 | Rajchman | Aug. 29, 1957 |
| 2,911,628 | Briggs et al. | Nov. 28, 1959 |

OTHER REFERENCES

Rajchman: "The Transfluxor," Proceedings of the IRE, March 1956, vol. 44 (pages 321–332), publication No. 57.